US006577989B2

(12) United States Patent
Florin

(10) Patent No.: US 6,577,989 B2
(45) Date of Patent: Jun. 10, 2003

(54) CIRCUIT ARRANGEMENT FOR MEASURED VALUE DETECTION, TRANSFER AND ANALYSIS

(75) Inventor: Wilhelm Florin, Duisburg (DE)

(73) Assignee: Krohne Messtechnik GmbH & Co., K.G. (DE)

( * ) Notice: Subject to any disclaimer, the term of this patent is extended or adjusted under 35 U.S.C. 154(b) by 164 days.

(21) Appl. No.: 09/769,105

(22) Filed: Jan. 25, 2001

(65) Prior Publication Data

US 2001/0016802 A1 Aug. 23, 2001

(51) Int. Cl.[7] .......... G06F 19/00
(52) U.S. Cl. .......... 702/189
(58) Field of Search .......... 702/189; 354/400, 354/60; 318/811; 180/179; 363/20, 21

(56) References Cited

U.S. PATENT DOCUMENTS 5,917,715 A * 6/1999 Lee .......... 363/21.04

FOREIGN PATENT DOCUMENTS

| | | |
|---|---|---|
| EP | 0 883 097 A2 | 12/1998 |
| GB | 2 229 897 A | 10/1990 |

* cited by examiner

*Primary Examiner*—John Barlow
*Assistant Examiner*—Tung S Lau
(74) *Attorney, Agent, or Firm*—Cesari and McKenna, LLP

(57) ABSTRACT

The circuit arrangement for measured value detection, transfer and analysis, with a measured value detection section (1), a measured value analyzing section (2) and a connection (5) consisting only of an outgoing conductor (3) and a return conductor (4) between the measured value detection section (1) and the measured value analyzing section (2), in connection with which the measured value detection section (1) has a measured value recorder (6), a measuring transformer circuit (7), a switch controller (8) connected upstream from the measuring transformer circuit (7) and a current regulator (9) connected upstream from the switch controller (8), in connection with which the measured value analyzing section (2) has a voltage source (10) and an analyzing circuit (11), and the switch controller (8) delivers a constant operating voltage for the measuring transformer circuit (7), and the current regulator (9)—controlled by the measuring transformer circuit (7)—sets a measured value and power supply current flowing through the outgoing conductor (3) and the return conductor (4) and representing the measured value. According to the invention, the power available for the measuring transformer circuit (7) is optimized namely in that the current consumption of the measuring transformer circuit (7) is controllable and is controlled in such a way that the voltage drop via the current regulator (9) is as small as possible.

6 Claims, 5 Drawing Sheets

CIRCUIT ARRANGEMENT FOR MEASURED VALUE DETECTION, TRANSFER AND ANALYSIS

Figure 1:
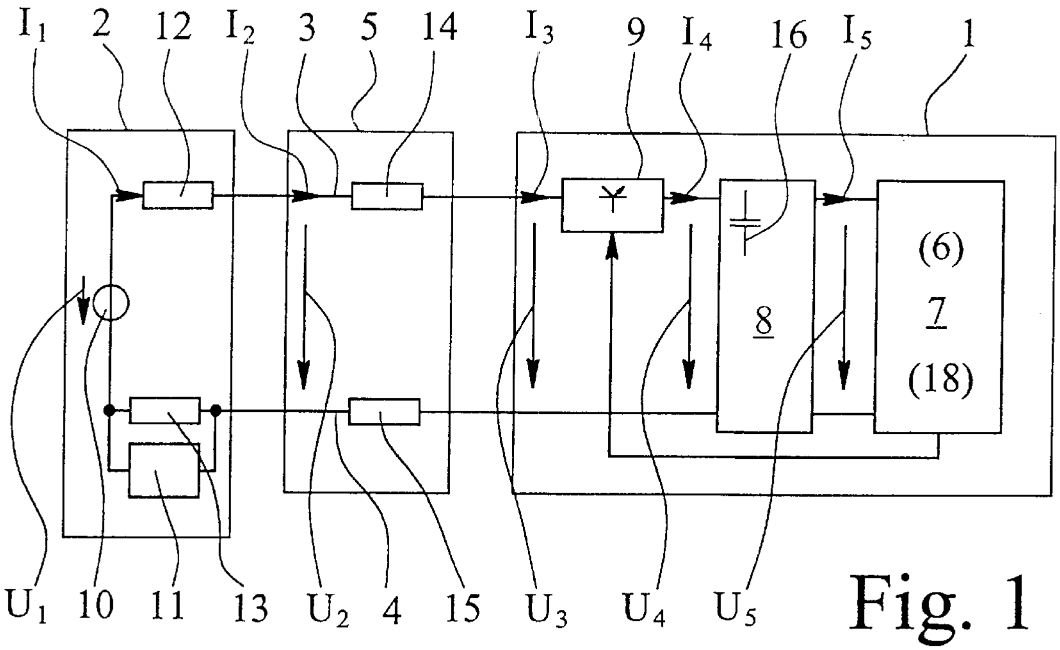

The invention relates to a circuit arrangement for measured value detection, transfer and analysis, with a measured value detection section, a measured value analyzing section and a connection consisting only of a outgoing conductor and a return conductor between the measured value detection section and the measured value analyzing section, in connection with which the measured value detection section has a measured value recorder, a measuring transformer circuit, a switch controller connected upstream from the measuring transformer circuit and a current regulator connected upstream from the switch controller, in connection with which the measured value analyzing section has a voltage source and an analyzing circuit, and the switch controller delivers a constant operating voltage for the measuring transformer circuit, and the current regulator, controlled by the measuring transformer circuit, sets a measured value and power supply current flowing through the outgoing conductor and the return conductor and representing the measured value.

Circuit arrangements of the kind being discussed are known in many instances (cf. e.g. German Patent 39 34 007, Europe Patent Disclosure 0,744,724 and German Patent Disclosure 197 23 645). For these circuit arrangements, it is essential that the connection between the measured value detection section and the measured value analyzing section consists of only two conductors and that a current flows through these two conductors that represents the measured value and also serves to supply electric power to the measured value detection section; the current flowing through the two conductors was thus designated in the introduction as measured value and power supply current.

Circuit arrangements of the kind in question are often conceived and designed in such a way that the voltage source in the measured value analyzing section is a direct voltage source, so the measured value and power supply current is a direct current. These circuit arrangements are also frequently conceived and designed in such a way that the measured value and power supply current represents the measured value between a lower limit value, namely 4 mA and an upper limit value, namely 20 mA; the lower limit value of 4 mA thus represents the smallest measured value and the upper limit value of 20 mA the greatest measured value (cf. German Patent 39 34 007, Page 2, Lines 19 through 24).

It will be taken as a basis throughout the following that the circuit arrangement in question is of the kind in which the voltage source provided in the measured value analyzing section is a direct voltage source, and the measured value and power supply current is thus a direct current. That is also why the connection between the measured value detection section and the measured value analyzing section was already described as consisting of an outgoing conductor and a return conductor. In addition, the technical current direction will be taken as a basis throughout the following; in an electric circuit connected to a direct voltage source, the direct current thus flows from the plus pole of the direct voltage source via the electric circuit to the minus pole of the direct voltage source.

The section of the circuit arrangement in question that is designated above and in the following as the measured value and power supply current is also referred to as the transmitter station (cf. German Patent 39 34 007) or as sending point (cf. European Patent Disclosure 0,744,724 and German Patent Disclosure 197 23 645), while the section of the circuit arrangement in question that is designated here as the measured value analyzing section is also referred to as the receiving station (cf. German Patent 39 34 007) or as receiving point (cf. European Patent Disclosure 0,744,724 and German Patent Disclosure 197 23 645). The connection, consisting of an outgoing conductor and a return conductor according to the terminology used here, between the measured value detection section and the measured value analyzing section is also referred to as a two-wire circuit station (cf. German Patent 39 34 007, European Patent Disclosure 0,744,724 and German Patent Disclosure 197 23 645).

Since the measured value current—representing the measured value—in the circuit arrangements concerned in this instance—as a rule, ranging from 4 mA to 20 mA as illustrated—is also the supply current for the measured value detection section, the electric power available for the measured value detection section is limited by the lower limit value of the measured value and power supply current, i.e., by 4 mA as a rule—which is often problematic (cf. German Patent 39 34 007, Page 2, lines 25 through 42).

In the circuit arrangement in question, the measuring transformer circuit—with the related measured value recorder—is actually the most important part in terms of function. Since the signal-to-noise ratio and the dynamic characteristics of the measuring transformer circuit depend on the power available for the measuring transformer circuit, the technical problem on which the invention is based is to optimize the power available for the measuring transformer circuit.

Figure 2:
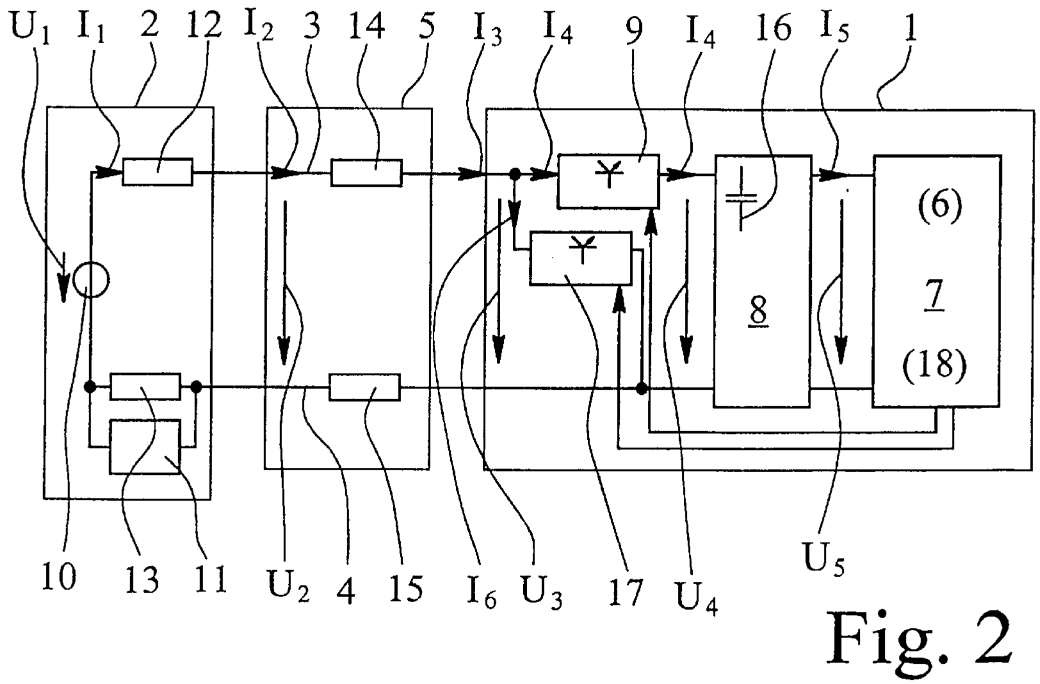

According to the invention, the aforementioned technical problem is solved for a circuit arrangement of the kind mentioned in the beginning first of all and essentially in that the current consumption of the measuring transformer circuit is controllable and is controlled in such a way that the voltage drop via the current regulator is as small as possible. The fact that the technical problem on which the invention is based is solved with this measure and why this is so are explained in detail below with the help of drawings. In the drawings:

FIG. 1 illustrates a first embodiment of a circuit arrangement according to the invention, FIG. 2 shows a second embodiment of a circuit arrangement according to the invention, and FIGS. 3 through 6 are graphical illustrations to further explain the invention.

The circuit arrangements illustrated in FIGS. 1 and 2 are intended and suitable for measured value detection, transfer and analysis and consist in their basic design of a measured value detection section 1, a measured value analyzing section 2 and a connection 5 consisting only of an outgoing conductor 3 and a return conductor 4 between the measured value detection section 1 and the measured value analyzing section 2.

As FIGS. 1 and 2 show, the measured value detection section 1 includes a measured value recorder 6, only suggested, a measuring transformer circuit 7, a switch controller 8 connected upstream from the measuring transformer circuit 7 and a current regulator 9 connected upstream from the switch controller. The measured value analyzing section 2 includes a voltage source 10 and an analyzing circuit 11. In the illustrated embodiment, two resistances 12, 13 are also provided. The analyzing circuit 11 is parallel to the resistance 13; the voltage drop originating at the resistance 13 and proportional to the measured value and power supply current is thus fed to analyzing circuit 11.

The switch controller 8 supplies a (at least essentially) constant operating voltage for the measuring transformer circuit 7. (German Patent 39 34 007, page 3, line 64, to page 4, line 45 as well as the following passages in relevant literature: Tietze.Schenk “Halbleiter-Schaltungstechnik”, 10th ed., Springer-Verlag, sections 18.5 “Schaltnetzgeräte”, 18.6 “Sekundär getaktete Schaltregler” and 18.7 “Primär getaktete Schaltregler”, pages 565 through 586, and “Lexikon Elektronik und Mikroelektronik”, VDI-Verlag, page 733). An ideal switch controller will be taken as a basis throughout the following, i.e., a zero-loss switch controller with constant output voltage.

The current regulator 9 is controlled by the measuring transformer circuit 7. The current regulator 9 sets a measured value and power supply current representing the measured value and flowing via the outgoing conductor 3 and the return conductor 4. (The circuit section referred to here as the current regulator is also referred to as a controllable voltage source, at any rate in European Patent Disclosure 0 744 724 and in German Patent Disclosure 127 23 645. The expression current controller is also used in place of the expression current regulator).

In the illustrated and described circuit arrangements, the voltage source 10, the resistance 12, the outgoing conductor 3, the current regulator 9, the primary side of the switch controller 8, the return conductor 4 and the resistance 13 are series connected; they form a first electric circuit. The secondary side of the switch controller 8 and the measuring transformer circuit 7 form a second electric circuit.

FIGS. 1 and 2 show another resistance 14 representing the resistance of the outgoing conductor 3 and a resistance 15 representing the resistance of the return conductor 3. The following are used to designate:

$U_1$: the voltage of the voltage source 10, $U_2$: the voltage at the “input” of the connection 5, consisting of the outgoing conductor 3 and the return conductor 4, between the measured value analyzing section 2 and the measured value detection section 1, $U_3$: the voltage at the input of the measured value detection section 1, $U_4$: the voltage at the input of the switch controller 8, $U_5$: the voltage at the output of the switch controller 8, which is identical to the voltage at the input of the measuring transformer circuit 7, $I_1$: the current flowing through the measured value analyzing section 2, $I_2$: the current flowing via the outgoing conductor 3 and the return conductor 4, $I_3$: the current flowing through the measured value detection section 1, $I_4$: the current flowing on the primary side through the switch controller 8 and $I_5$: the current flowing on the secondary side through the switch controller 8 and through the measuring transformer circuit 7.

With this established, the following is valid:

The power $P_1$ that the voltage source 10 makes available in the measured value analyzing section 2 is shown by the following equation:

$$P_1=U_1 \cdot I_1 \qquad \text{Equation 1}$$

If $R_{12}$ is the value of the resistance 12 and $R_{13}$ the value of the resistance 13, then the following is valid for the power loss $P_{V,1}$ within the measured value analyzing section 2:

$$P_{V,1}=I_1^2 \cdot (R_{12}+R_{13}) \qquad \text{Equation 2}$$

If $R_{14}$ is the value of the resistance 14 of the outgoing conductor 3 and $R_{15}$ is the value of the resistance 15 of the return conductor 4, then the following is valid for the power loss $P_{V,2}$ on the connection 5 between the measured value analyzing section 2 and the measured value detection section 1:

$$P_{V,2}=I_2^2 \cdot (R_{14}+R_{15}) \qquad \text{Equation 3}$$

The power $P_3$ that is available for the measured value detection section 1 is predetermined by the voltage $U_1$ of the voltage source 10, the resistances $R_{12}$, $R_{13}$, $R_{14}$ and $R_{15}$ as well as by the current measured value and power supply current; the following is valid for the power $P_3$:

$$P_3=P_1-P_{V,1}-P_{V,2}=U_3 \cdot I_3 \qquad \text{Equation 4}$$

The following is valid for the voltage $U_3$ at the measured value detection section 1:

$$U_3=U_1-I_1 \cdot (R_{12}+R_{13})-I_2 \cdot (R_{14}+R_{15}) \qquad \text{Equation 5}$$

As FIGS. 1 and 2 show, the following furthermore applies to the currents $I_3$, $I_2$ and $I_1$:

$$I_3=I_2=I_1 \qquad \text{Equation 6}$$

The following is thus valid for the voltage $U_3$ at the measured value detection section 1:

$$U_3=U_1-I_3 \cdot (R_{12}+R_{13}+R_{14}+R_{15}) \qquad \text{Equation 7}$$

The following is valid for the power $P_3$ that is available for the measured value detection section 1:

$$P_3=U_1 \cdot I_3-I_3^2 \cdot (R_{12}+R_{13}+R_{14}+R_{15}) \qquad \text{Equation 8}$$

The power $P_3$ available for the measured value detection section 1 is thus dependent on the measured value, namely the measured value and power supply current $I_3$. In the case of a small measured value, if the measured value and power supply current $I_3$ is 4 mA for example, there is consequently less power available than with a large measured value, if the measured value and power supply current $I_3$ is 20 mA, for example. According to the invention, it is now ensured that of the power $P_3$ available for the measured value detection section 1, the greatest possible portion is available for the measuring transformer circuit 7, as shown by the following:

The following applies to the current regulator 9:

$$I_3=I_4 \qquad \text{Equation 9}$$

and $$U_3>U_4 \qquad \text{Equation 10}$$

The following is valid for the power loss $P_{V,3}$ in the current regulator 9:

$$P_{V,3}=I_3 \cdot U_3-I_4 \cdot U_4=I_3 \cdot (U_3-U_4) \qquad \text{Equation 11}$$

Since a precondition is that the switch controller 8 is zero-loss, at the switch controller 8 the following is valid for the input-side power $P_4$ and for the output-side power $P_5$ that is available for the measuring transformer circuit 7:

$$P_4=U_4 \cdot I_4=P_5=U_5 \cdot I_5 \qquad \text{Equation 12}$$

If one considers the power P5 that is available for the measuring transformer circuit 7, the following applies:

$$P_5=P_3-I_3 \cdot (U_3-U_4)=P_3-I_3 \cdot U_3+I_3 \cdot U_4 \qquad \text{Equation 13}$$

Equation 13 shows that the power $P_5$ that is available for the measuring transformer circuit 7 can be optimized by the greatest possible voltage $U_4$. Since the voltage $U_4$ cannot become greater than the voltage $U_3$, the difference between the voltage $U_3$ and the voltage $U_4$ must be as small as possible. "As small as possible"—instead of "zero"—takes into consideration that the current regulator 9 critically requires a minimal difference between the voltage $U_3$ and the voltage $U_4$ in order—controlled by the measuring transformer circuit 7—to be able to set a measured value and power supply current $I_3$ representing the measured value.

Since it is a prerequisite that the switch controller 8 be zero-loss, i.e., that the primary-side power $P_4$ is identical to the secondary-side power $P_5$ because the primary-side current $I_4$ of the switch controller 8 is predetermined in the stationary condition, namely identical to the measured value and power supply current $I_3$ predetermined by the measuring transformer circuit 7, and since the secondary-side voltage $U_5$ of the switch controller 8 is constant, a short-term reduction of the current consumption of the measuring transformer circuit 7, i.e., a short-term reduction of the current $I_5$ flowing through the measuring transformer circuit 7 and on the secondary-side through the switch controller 8, leads to an increase of the voltage $U_4$ on the primary side of the switch controller 8, because the current $I_3$, now greater than the current $I_4$, can no longer by accepted by the switch controller 8. Through the difference between currents I3 and 14, namely $I_3-I_4>0$, a fictive capacitance is loaded and the voltage $U_4$ increases. As soon as the voltage $U_4$ has reached the desired level—"as great as possible", the current consumption of the measuring transformer circuit 7 must be increased again in such a way that the current $I_3$ is the same as the current $I_4$. Since the voltage $U_4$ is now greater than before, the power $P_4=U_4 \cdot I_4$ is also greater than previously. Since the voltage $U_5$ at the output of the switch controller 8 is constant, the current $I_5$ also becomes greater than before and consequently also the power $P_5=U_5 \cdot I_5$ available for the measuring transformer circuit 7. This shows that the measure according to the invention to control the measuring transformer circuit's 7 current consumption in such a way that the voltage drop via the current regulator 9, i.e., the difference between the voltage $U_3$ and the voltage $U_4$, is as small as possible, leads to an optimization of the power $P_5$ available for the measuring transformer circuit 7.

In the embodiment illustrated in FIGS. 1 and 2, it is implied that the switch controller 8 has a capacitor 16 on the input side. An example of such a switch controller 8 is the switch controller LT 1176-5 of the Linea Technology company. The capacitor 16 simplifies the control of the voltage $U_4$, because in this way, the change rate of change of the voltage $U_4$ when $I_3$ is not set identically to $I_4$ can be reduced considerably.

If, as is true for the embodiment illustrated in FIGS. 1 and 2, the switch controller 8 is provided on the input side with a capacitor 16, an operating status may develop in which the measured value and power supply current I3 cannot be set proportionally to the measured value.

Starting with a small measured value and thus a small measured value and power supply current $I_3$ of 4 mA for example, a relatively high value develops for the voltage $U_4$ because the voltage $U_3$ is also relatively great,—because the voltage drops at the resistances 12, 13, 14 and 15 are relatively small. If a relatively large measured value then appears suddenly, and consequently a relatively large measured value and power supply current $I_3$, e.g. 20 mA, should be set, this is not possible if the voltage $U_4$ buffered by the capacitor 16 is greater than the voltage $U_3$ that would have to develop due to the relatively great voltage drops at the resistances 12, 13, 14 and 15. Since the current regulator 9 can only operate if the voltage $U_3$ is greater than the voltage $U_4$, the measured value and power supply current $I_3$ corresponding to the large measured value cannot be set.

To solve the above illustrated problem, in the embodiment shown in FIG. 2 of a circuit arrangement according to the invention, a second current regulator 17 controlled by the measuring transformer circuit 7 and only activated in case of need is provided that is connected with its input with the input of the first current regulator 9 and with its output with the return conductor 4. In this embodiment, the measured value and power supply current $I_3$ that should be proportional to the measured value is composed of the current $I_4$ via the first current regulator 9 and the current $I_6$ via the second current regulator 17. As a result, the required measured value and power supply current $I_3$ can be set even in the operating status described above.

In the embodiment of the invention's circuit arrangement as illustrated in the preceding in FIG. 2, the current $I_6$ does not contribute via the second current regulator 17 to the power $P_5$ for the measuring transformer circuit 7; that is, the current $I_6$ via the second current regulator 17 is undesirable, in principle. Consequently, in the embodiment according to FIG. 2, the second current regulator 17 provided additionally in this instance is only activated "in case of need", namely only when and as long as the problem described above still exists.

In addition, something that is not shown FIGS. 1 and 2 is that to control its current consumption and/or to control the second current regulator 17, the measuring transformer circuit 7 can be programmable, e.g. via the voltage $U_1$ of the voltage source 10 and/or via the resistances 12 and 13 in the measured value analyzing section 2 and/or via the resistances 14, 15 of the outgoing conductor 3 and/or of the return conductor 4 and/or via the capacitance of the capacitor 16 connected parallel to the input of the switch controller 8. There is also the possibility to introduce the voltage drop into the measuring transformer circuit 7 via the first current regulator 9, e.g. via an A-D converter, not illustrated, to control the current consumption of the measuring transformer circuit 7 and/or to control the second current regulator 17.

The invention will now be explained again using the graph illustrations in FIGS. 3 through 6:

The voltage $U_3$ at the input of the measured value detection section 1, that is, the voltage $U_3$ at the input of the current regulator 9, should be considered first. It depends on the voltage $U_1$ of the voltage source 10, the total of the resistances 12, 13, 14 and 15 as well as the current $I_3$ flowing through the measured value detection section 1. In practical experience, very different characteristics may result in this case due to different measured value analyzing sections 2 and different connections 5 between measured value detection section 1 and the measured value analyzing section 2. These are not known when the measured value detection section 1 is delivered; the measured value detection section 1 must therefore adapt automatically to the conditions encountered.

Figure 3:
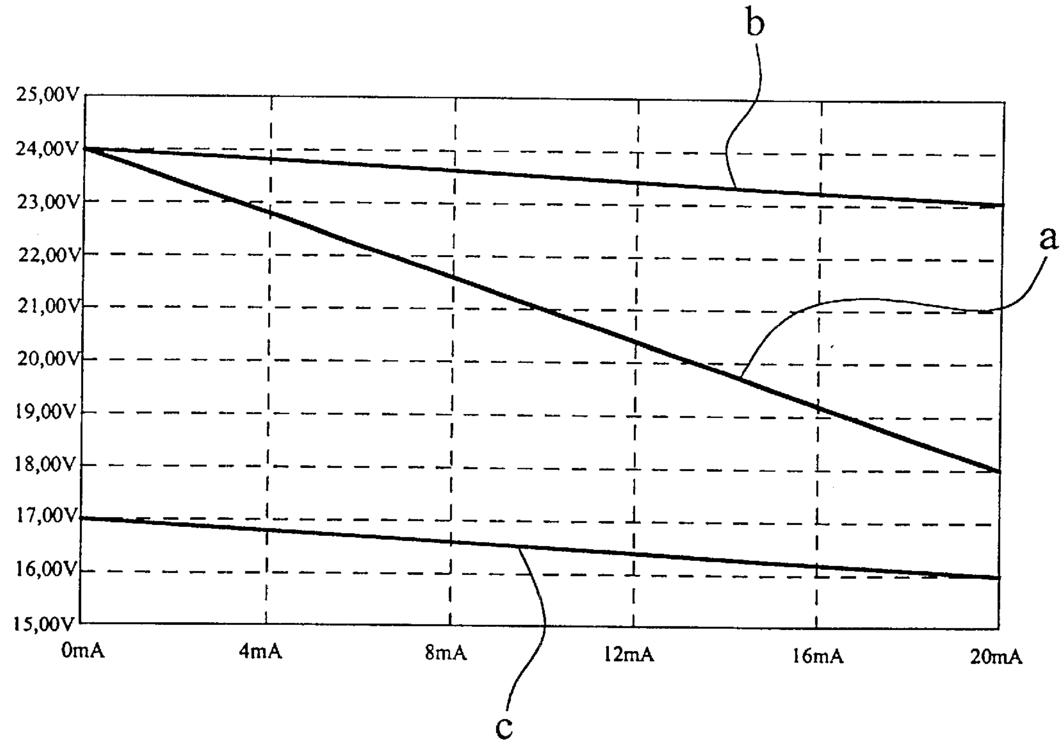

In FIG. 3, characteristic curves are illustrated that show the voltage $U_3$ at the input of the current regulator 9 depending on the current $I_3$ flowing through the measured value detection section 1. In this connection, the following are based on the characteristic curve a: a voltage $U_1$ of 24V and a 300 Ω resistance of the connection 5 the characteristic curve b: a voltage $U_1$ of 24 V and a 50 Ω resistance of the connection 5, and the characteristic curve c: a voltage $U_1$ of 17 V and a 50 Ω resistance of the connection 5.

The characteristic curve a—for a voltage $U_1$ of 24 V and a 300 Ω resistance of the connection—is particularly widely used since this characteristic curve meets the requirements of intrinsic safety in the case of explosion protection.

Figure 4:
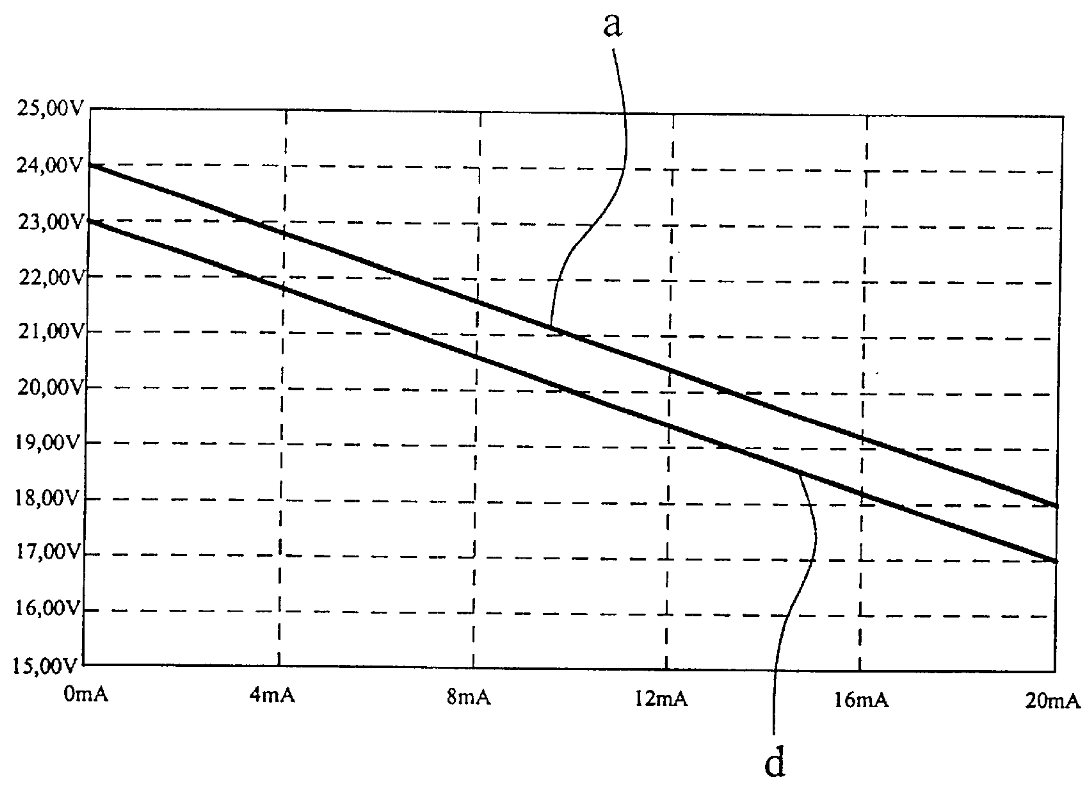

Ideally, the voltage $U_4$ at the output of the current regulator 9 is one volt below the voltage $U_3$ at the input of the current regulator 9. The corresponding characteristic curve d is shown in FIG. 4 together with the characteristic curve a from FIG. 3.

The current regulator 9 is also necessary because the current $I_5$ flowing through the measuring transformer circuit 7 cannot be controlled as precisely as is required for the current $U_3$ representing the measured value.

As already stated, the current regulator 9 is controlled by the measuring transformer circuit 7 in such a way that it sets a measured value and power supply current, the current $I_3$, representing the measured value and flowing via the connection 5. For this purpose, the measuring transformer circuit 7 has a micro-controller 18 not shown in detail, that is also supplied by the current $I_3$ flowing through the measured value detection section 1.

The circuit arrangement according to the invention can be used for a number of quite different measured value recorders 6. The measured value recorder 6 can be designed for detecting temperature, pressure, humidity, fill level or throughput, for example. In particular, the measured value recorder 6 can be operated in clocked manner, whereby the current consumption of the measuring transformer circuit 7 can be influenced altogether. Such a clocked operation is known in the case of a magnetic-inductive flowmeter, for example (cf. U.S. Pat. No. 4,766,770); a microwave radar can also be operated in clocked manner as a measured value recorder 6.

If the current $I_5$ flowing through the measuring transformer circuit 7 has a pulsating characteristic, then the current regulator 9 must ensure a smoothing; a pulsating characteristic of the current $I_3$, that is, of the measured value and power supply current representing the measured value, is namely not desired. The extent of the necessary smoothing also determines the operation's required voltage drop via the current regulator 9, that is, the voltage difference between the voltage $U_3$ and the voltage $U_4$.

The problems present in the circuit arrangement according to the invention become particularly clear when two extreme cases are considered: on the one hand, the extreme eventuality that the measured value suddenly changes from 100% to 0%, and on the other hand, the extreme case that the measured value suddenly changes from 0% to 100%. On equal footing with these extreme cases are what are referred to as failure data that are characterized by a current $I_3$ that is either smaller than 3.6 mA or greater than 21 mA. In this respect, NAMUR-Empfehlung NE 43 "Vereinheitlichung des Signalpegels für die Ausfallinformation von Digitalen Meβumformern mit analogem Ausgangssignal" is referred to: version: Jan. 18, 1994, first edition: Jan. 18, 1994, distributed by the NAMUR-Geschäftsstelle, c/o Bayer AG, Building K 9, 51368 Leverkusen.

Figure 5:
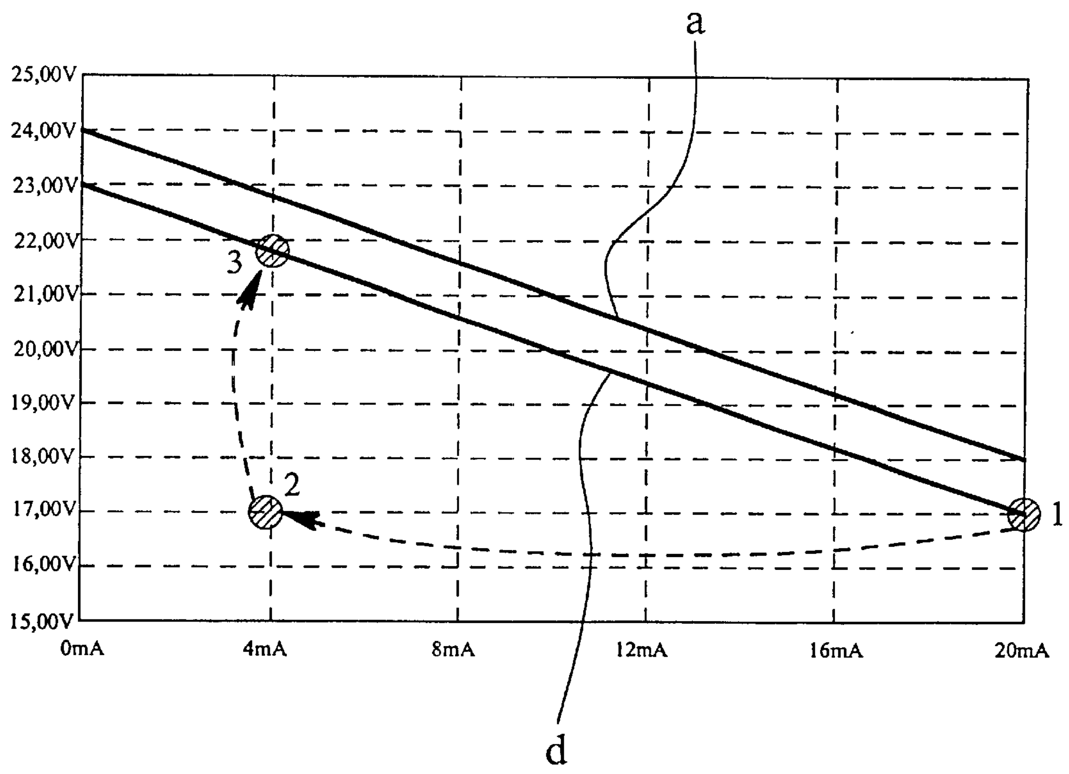

For the first extreme case, in which the measured value suddenly changes from 100% to 0%, the graph in FIG. 5 is referred to, which first shows the characteristic curves a and d in which working points 1, 2 and 3 are also drawn.

We start from working point 1. The current $I_3$ may suddenly change due to the current regulator 9. Because of the capacitor 16, however, the voltage $U_4$ cannot suddenly change. So there is a shift from working point 1 to working point 2.

If one assumes an ideal switch controller 8, that is, one that has no power loss, then the following results for the power available for the measuring transformer circuit 7 (see the Equation 12):

$$P_5=P_4=U_4 \cdot I_4=17\ V \cdot 4\ mA=68\ mW.$$

Working point 3 is desired, however. The following power would be available there:

$$P_5=P_4=U_4 \cdot I_4=21.8\ V \cdot 4\ mA=87.2\ mW.$$

Assuming a constant value of, for example, 5 V for voltage $U_5$, that is the voltage at the output of the switch controller 8 that is identical to the voltage at the input of the measuring transformer circuit 7, the following is the result for the two previously calculated power levels for the current $I_5$:

$$I_5=P_5=U_5=68\ mW:\ 5\ V=13.6\ mA$$

or $$I_5=P_5=U_5=87.2\ mW:\ 5\ V=17.4\ mA.$$

Working point 3 is now attained from working point 2, but not by increasing the current $I_5$. The current $I_4$ would immediately become greater than the current $I_3$, and charge would be taken from the capacitor 16. This would in turn lead to a reduction of the voltage $U_4$ and thus to a shift of the working point 2 in the undesirable direction, namely to a smaller voltage $U_4$. The desired working point 3 is achieved when the current $I_5$ is reduced. The current $I_4$ immediately becomes smaller than the current $I_3$. The capacitor 16 at the input of the switch controller 8 is charged and the voltage $U_4$ increases.

Figure 6:
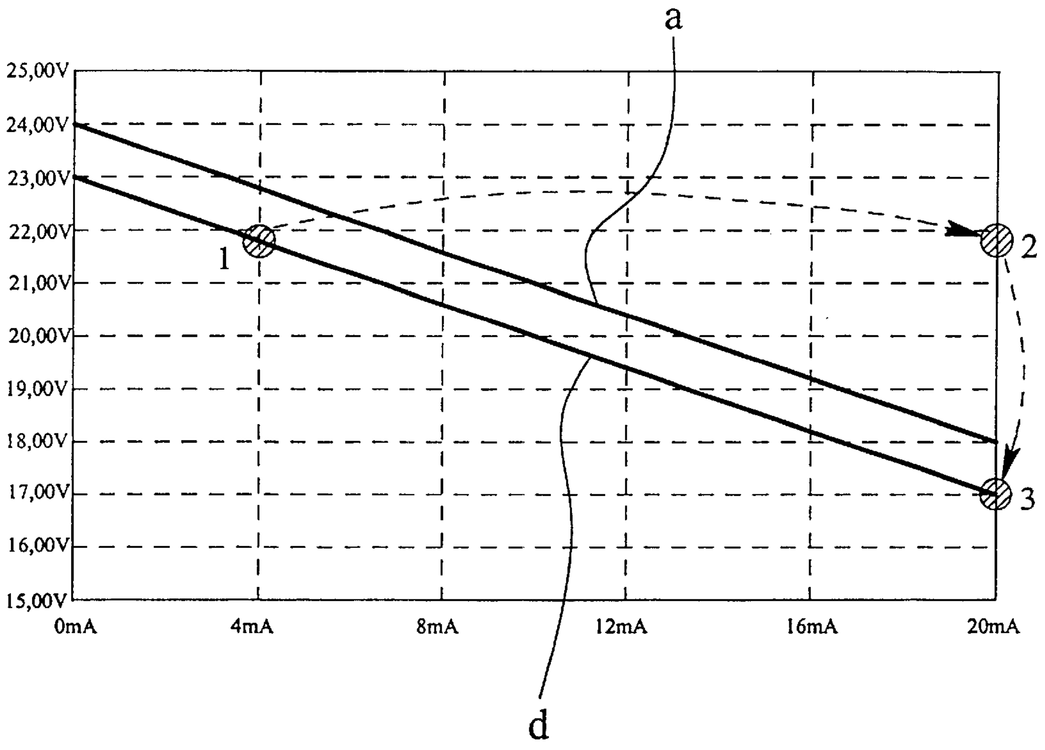

For the second extreme case, in which the measured value suddenly changes from 0% to 100%, the graph in FIG. 6 is referred to, which, like FIG. 5, shows the characteristic curves a and d in which working points 1, 2 and 3 are also drawn.

As in the first extreme case, a sudden change of the voltage $U_4$, that is, a sudden change of the voltage at the input of the switch controller 8, is not possible in the second extreme case either. The current regulator 9 is then not able to set the current $I_3$ attributable 100% to the measured value because even if the voltage $U_4$ were identical to the voltage $U_3$, that is, if there were no voltage drop at the current regulator 9, the measured value analyzing section 2 cannot deliver the corresponding current via the connection 5; the working point 2 is thus not a possible working point.

To be able to control the second extreme case requires the second current regulator 17 shown in FIG. 2, which can set the corresponding current $I_3$, that is, 20 mA in the present case. The working point 3 is thus possible with the additional current regulator 17. The second current regulator 17 is thus not absolutely necessary but rather only when the voltage $U_4$ cannot be reduced at the same rate of change as the measured value can change.

The following is valid for the setting produced in the micro-controller 18 or with the micro-controller 18:

Priority setting:

$$I_3=4\ mA+M,\ 16\ mA,$$

where M as the factor for the measured value changes from 0 to 1.

If the voltage $U_4$ becomes identical to the voltage $U_3$, the setting automatically changes from the current regulator 9 to the second current regulator 17. This can take place via the micro-controller 18 or by means of corresponding hardware.

Secondary setting:

$$U_4 = U_3 - U_{reserve};$$

if the voltage $U_{reserve}$ is too great, the current $I_5$ is reduced, and if the voltage $U_{reserve}$ is too small, the current $I_5$ is increased.

It should also be noted that the circuit arrangement according to the invention has been described in connection with a voltage source 10—designed as a direct voltage source—in the measured value analyzing section 2, so the measured value and power supply current $I_3$ is present as direct current. The lesson of the invention can also be easily applied to forms of construction in which an alternating voltage source is used as voltage source and consequently the measured value and power supply current $I_3$ is present as an alternating current.

Lastly, it is expressly pointed out that what was explained in the preceding in connection with FIGS. 3 through 6 also is a part of the invention or is also essential to the invention. Insofar as the patent claims do not completely contain or do not contain this, the patent claims are subject to be construed accordingly.

What is claimed is:

1. A circuit arrangement for measured value detection, transfer and analysis For use in a power generation circuit, said arrangement comprising a measured value detection section including
- a measured value recorder,
- a measuring transformer circuit,
- a switch controller having an input and connected upstream from the measuring transformer circuit, and
- a first current regulator having an input and connected upstream from the switch controller in series therewith;

a measured value analyzing section including
- a voltage source, and
- an analyzing circuit;

a connection consisting only of
- an outgoing conductor, and
- a return conductor between the measured value detection section and the measured value analyzing section, said switch controller delivering a constant operating voltage for the measuring transformer circuit, and the first current regulator, controlled by the measuring transformer circuit, setting a measured value and power supply current flowing through the outgoing conductor and the return conductor representing the measured value, and a capacitor connected parallel to the input of the switch controller whereby the current consumption of the measuring transformer circuit is controlled in such a way that the voltage drop via the first current regulator is made as small as possible, by reducing the current consumption of the measuring transformer circuit in the short term.

2. The circuit arrangement according to claim 1, and further including a second current regulator having an input and an output and controlled by the measuring transformer circuit, said second current regulator being connected with its input to the input of the first current regulator and with its output to the return conductor.

3. The circuit arrangement according to claim 2, wherein the measuring transformer circuit is programmed to control its current consumption and/or to control the second current regulator, via the voltage of the voltage source and/or resistances in the measured value analyzing section and/or resistances of the outgoing conductor and/or of the return conductor and/or capacitance of the capacitor connected parallel to the input of the switch controller.

4. A method for measured value detection, transfer and analysis For use in connection with power generation said method comprising the following steps:

providing a circuit arrangement for measured value detection, transfer and analysis, with a measured value detection section, a measured value analyzing section and a connection consisting only of an outgoing conductor and a return conductor between the measured value detection section and the measured value analyzing section, in connection with which the measured value detection section has a measured value recorder, a measuring transformer circuit, a switch controller connected upstream from the measuring transformer circuit and a first current regulator connected upstream from the switch controller and in series with the switch controller, in connection with which the measured value analyzing section has a voltage source and an analyzing circuit, and a capacitor connected parallel to the input of the switch controller, the switch controller delivering a constant operating voltage for the measuring transformer circuit, the first current regulator, controlled by the measuring transformer circuit, setting a measured value and power supply current flowing through the outgoing conductor and the return conductor and representing the measured value, and controlling the current consumption of the measuring transformer circuit in such a way that the voltage drop via the first current regulator is as small as possible, by reducing the current consumption of the measuring transformer circuit in the short term.

5. The method according to claim 4, including the additional steps of:

providing a second current regulator connected with its input to the input of the first current regulator and with its output to the return conductor, and controlling the second current regulator by the measuring transformer circuit.

6. The method according to claim 5 including the step of:

controlling the current consumption of the measuring transformer circuit and/or the second current regulator via the voltage of the voltage source and/or resistances in the measured value analyzing section and/or via resistances of the outgoing conductor and/or of the return conductor and/or capacitance of the capacitor connected parallel to the input of the switch controller.

* * * * *